United States Patent [19]

Burns et al.

[11] Patent Number: 4,962,527
[45] Date of Patent: Oct. 9, 1990

[54] SERIES RINGING SIGNAL GENERATOR

[75] Inventors: Robert V. Burns; Sanjay Gupta, both of Phoenix, Ariz.

[73] Assignee: Siemens Transmission Systems, Inc., Phoenix, Ariz.

[21] Appl. No.: 355,221

[22] Filed: May 22, 1989

[51] Int. Cl.$^5$ .............................................. H04M 3/02
[52] U.S. Cl. .................................. 379/418; 379/253; 379/255
[58] Field of Search ............... 379/252, 253, 418, 251, 379/254, 255

[56] References Cited

U.S. PATENT DOCUMENTS 4,270,028  5/1981  Young ................................. 379/252
4,284,854  8/1981  Hayward et al. .
4,349,703  9/1982  Chea, Jr. .

OTHER PUBLICATIONS

"A Microcomputer Controlled Digital Frequency Synthesizer" M. Wagdy, IEEE MTC/86 Conference Record; Mar. 25-27, 1986, pp. 236-238.

Primary Examiner—James L. Dwyer
Attorney, Agent, or Firm—Jeffrey P. Morris

[57] ABSTRACT

A series ringing signal generator is disclosed which comprises a source of a user control signal. A programmable ringing signal generator is provided for generating an analog sine wave signal having a selectable amplitude and frequency in response to a selection signal. Finally, sequencing means, coupled between the source of the user control signal and the programmable ringing signal generator, is provided for generating a sequence of selection signals in response to said user control signal.

3 Claims, 2 Drawing Sheets

SERIES RINGING SIGNAL GENERATOR

BACKGROUND OF THE INVENTION

1. Field of the Invention

The present invention relates to a ringing signal generator for a telephone central office which is capable of producing a time multiplexed ringing series.

2. Description of the Prior Art

A multifrequency (MF) ringing system is one which typically includes a ringing signal generator which produces a time multiplexed series of four different ringing signals having mutually different frequencies and corresponding amplitudes. In known arrangements, four different ringers in subscriber telephone instruments are connected in parallel across the tip and ring signal lines. Each of these ringers is tuned to one of the four ringing signal frequencies in the series of ringing signals. When it is desired to ring a particular one of the ringers, the ring signal with the frequency to which the selected ringer is tuned, and having the corresponding amplitude is placed on the tip and ring signal lines.

In the central office, a series ring signal generator repetitively produces a time multiplexed series of the four different ring signals. The appropriate ring signal from such a ring signal generator is supplied to the ringer in the selected subscriber telephone instrument by coupling the output of the ring signal generator to the tip and ring signal lines during the time interval when the appropriate ring signal is being produced by the series ring signal generator.

Series ring signal generators are known. U.S. Pat. No. 4,349,703, issued Sept. 14, 1982 to Chea, Jr. describes a ring signal generator which is capable of producing one of four possible ring signals having different frequencies. FIG. 1 of this patent illustrates four separate ringing frequency generators 20-26. These are coupled to tip T and ring R lines (14 and 16) through ringing circuits 10 and 12, respectively. "... [T]he energizing and deenergizing of the ring circuitry is programmably controlled to provide for either hardware or software generation of ringing cadence ...." (See column 2 lines 15 to 18.)

Apparatus according to this patent requires four ringing signal generators which must be maintained to keep the frequencies and amplitudes within acceptable limits. In addition, the separate ringing signal generators are not phase aligned so that switching from one to another to form the time-multiplexed sequence introduces impulse noise into the ringing signal sequence. A ringing signal generator which comprises a single unit is desirable. In addition, a ringing signal generator in which each of the component ringing signals in the time multiplexed sequence begins and ends on a zero crossing is also desirable. In addition, a ringing signal generator which is capable of changing the individual components in the time multiplexed sequence, or is capable of selectably producing one of a plurality of different ringing signal sequences is also desirable.

SUMMARY OF THE INVENTION

In accordance with principles of the present invention, a series ringing signal generator comprises a source of a user control signal. A programmable ringing signal generator is provided for generating an analog sine wave signal having a selectable amplitude and frequency in response to a selection signal. Finally, sequencing means, coupled between the source of the user control signal and the programmable ringing signal generator, is provided for generating a sequence of selection signals in response to said user control signal.

The foregoing and other features and advantages of the invention will become apparent from the following detailed description of a preferred embodiment of the invention as illustrated by the accompanying drawings, wherein:

DESCRIPTION OF THE PREFERRED EMBODIMENT

There are many different series of ringing signals which may be used for the MF ringing schemes described above.

TABLE I

| Series | F1 | F2 | F3 | F4 | |
|---|---|---|---|---|---|
| Decimonic | 30 | 40 | 50 | 60 | Hz |
| Harmonic | 25 | 33.33 | 50 | 66.66 | Hz |
| Synchromonic | 30 | 42 | 54 | 66 | Hz |
| Voltage | 100 | 110 | 125 | 140 | Vrms |

Table I lists three types of MF ringing schemes. Each row illustrates the frequencies of each of the four ringing signals making up the series, and the last row illustrates the voltage corresponding to the frequency of the ringing signal.

Figure 1:
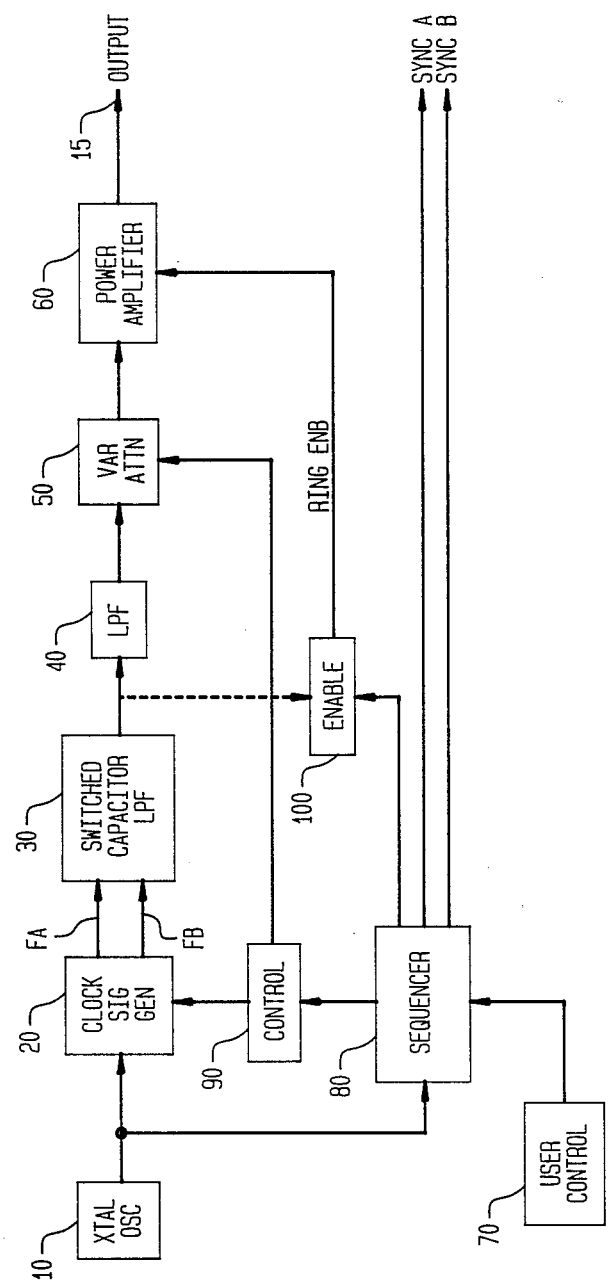
FIG. 1 is a block diagram of a series ringing signal generator in accordance with the present invention.

FIG. 1 illustrates a series ringing signal generator which may be used to produce an MF ringing signal series. In FIG. 1, an output terminal of a crystal oscillator 10 is coupled to respective clock signal input terminals of a clock signal generator 20 and a sequencer 80. First (FA) and second (FB) output terminals of the clock signal generator 20 are coupled to respective input terminals of a switched capacitor low pass filter (LPF) 30. An output terminal of the switched capacitor LPF 30 is coupled to an input terminal of an analog low pass filter (LPF) 40. An output terminal of LPF 40 is coupled to a signal input terminal of a variable attenuator 50. An output terminal of variable attenuator 50 is coupled to a signal input terminal of a power amplifier 60. An output terminal of power amplifier 60 is coupled to an output terminal 15 of the series ringing signal generator. Output terminal 15 may be coupled to utilization circuitry (not shown) which couples the generated series ringing signal to the tip and ring lines across which the subscriber telephone instruments are connected.

An output terminal of a source of a user control signal 70, which may be a switch, is coupled to a first input terminal of a sequencer 80. A first output terminal of sequencer 80 is coupled to an input terminal of a control signal generator 90. A first output terminal of control signal generator 90 is coupled to a control signal input terminal of the clock signal generator 20. A second output terminal of control signal generator 90 is coupled to a control input terminal of the variable attenuator 50.

A second output terminal of the sequencer 80 is coupled to an input terminal of an enable signal generator 100. An output terminal of the enable signal generator 100 is coupled to a control input terminal of the power amplifier 60. A first and a second synchronization signal output terminal of the sequencer 80 are coupled to respective synchronization output terminals SYNC A and SYNC B. Synchronization output terminals SYNC A and SYNC B are coupled to the utilization circuitry (not shown).

The combination of: crystal oscillator 10, clock signal generator 20, switched capacitor LPF 30, LPF 40, variable attenuator 50, power amplifier 60, and control signal generator 90 operate as a programmable ringing signal generator. Such a programmable ringing signal generator is described in detail in U.S. patent application Ser. No. 07/285,460, entitled "Programmable Ring Signal Generator", filed Dec. 16, 1988 by Burns et al., and will not be described in more detail below. The programmable ring signal generator (10–60, 90) selectably generates one of a predetermined plurality of ringing signals, each having a given frequency and amplitude, in response to a corresponding one of a predetermined plurality of selection signals. In the above U.S. patent application, a user control signal source produces one of the predetermined plurality of selection signals, and the ringing signal generator produces the ringing signal corresponding to the selection signal.

In the present illustrated embodiment, the predetermined plurality of ringing signals includes the ringing signals listed in Table I. That is, the predetermined plurality of ringing signals includes the ten mutually different ringing signals shown in Table I. Consequently, there are 10 mutually different selection signals which may be properly applied to the input terminal of the control signal generator 90. Control signal generator 90 conditions the remainder of the ringing signal generator (10–60) to produce the ringing signal corresponding to the selection signal present at the input terminal of the control signal generator, in the manner described in the above U.S. patent application.

The series ringing signal generator illustrated in FIG. 1 further includes a sequencer 80 and an enable signal generator 100, which operate in the following manner. The user control signal source 70 produces one of a predetermined plurality of user control signals; one corresponding to each of the different MF ringing signal series which the series ringing signal generator can produce. In the present illustrated embodiment, for example, the user control signal source 70 produces one of three user control signals, corresponding to the respective signal series shown in Table I.

Sequencer 80 selectably produces one of a predetermined plurality of time multiplexed selection signal sequences. Each of the selection signal sequences includes four time multiplexed selection signals. Each of the four time multiplexed selection signals are the selection signals which cause the control signal generator 90 to condition the programmable ring signal generator (10–60) to produce the desired ring signal during the corresponding time slot in the ringing signal.

The power amplifier 60, which may be a known pulse width modulated power amplifier, has a controllable output. Power amplifier 60 selectably produces either the desired ringing signal, or no signal at all, in response to a control signal from the enable signal generator 100.

The enable signal generator 100 is responsive to timing signals from the sequencer 80 to disable the output of the power amplifier during the interstices between the respective ringing signals making up the ringing signal series. When the output signal from the power amplifier 60 is disabled, the output terminals of the power amplifier 60 are at a low impedance. This allows the tip and ring signal lines to be discharged.

It is also advantageous that the individual ringing signals which make up the ringing signal series both begin and end on a zero crossing. This has the effect of reducing impulse noise in the series ringing signal. A system which may perform this is illustrated in phantom in FIG. 1. The output terminal from the switched capacitor LPF 30 is coupled to a second input terminal of the enable signal generator 100. The enable signal generator 100 not only disables the output signal from the power amplifier during the interstices between the respective ringing signals making up the ringing signal series, in response to signals from the sequencer 80; but also disables the output signal at a zero crossing of the ending ringing signal, and enables the output signal at a zero crossing of the beginning ringing signal, as detected in the output signal from the switched capacitor LPF 30.

Figure 2:
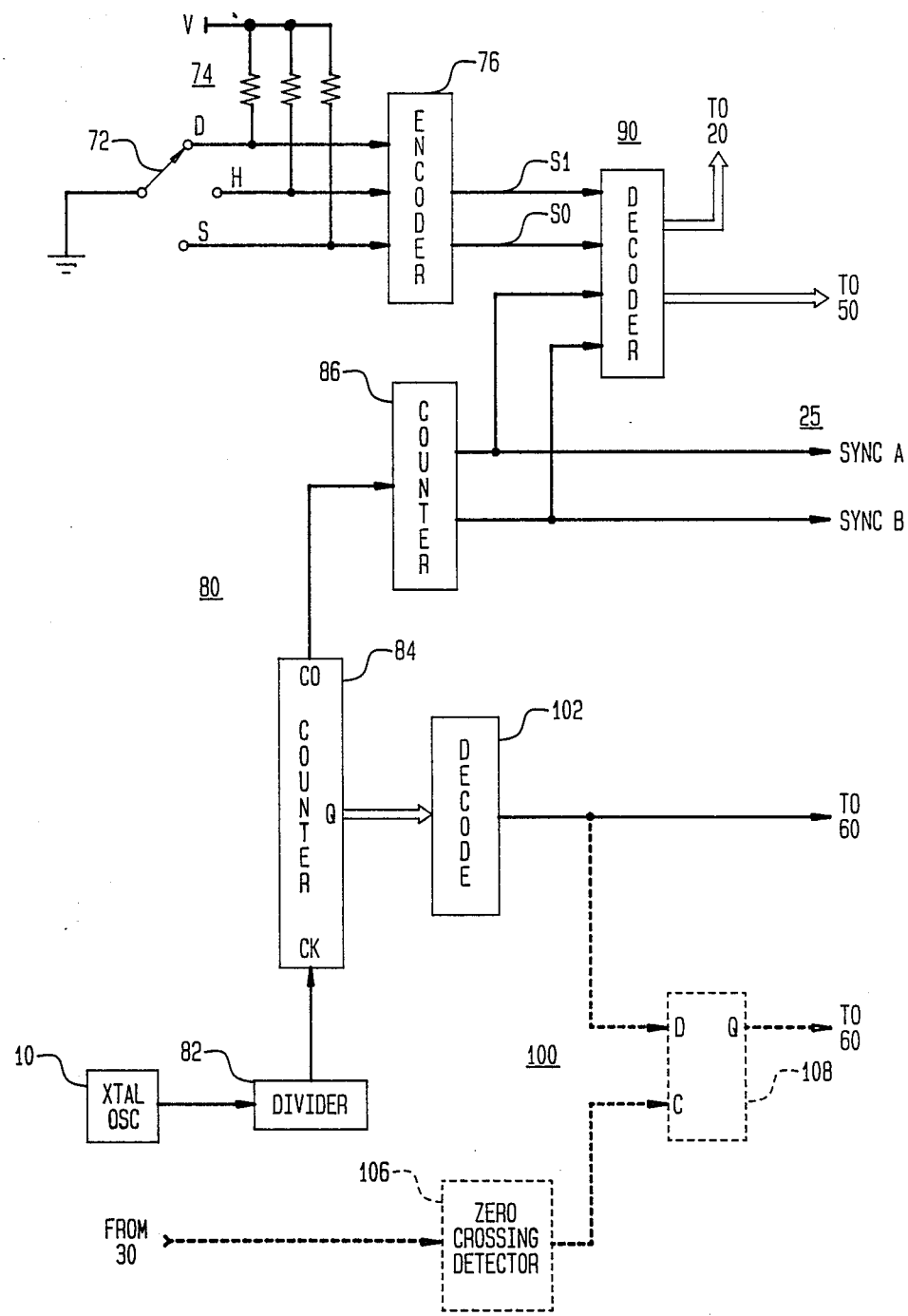
FIG. 2 is a diagram, partially in block form, and partially in schematic form, of: a source of a user control signal; a control signal generator; a sequencer; and an enable signal generator; which may be used in the series ringing signal generator illustrated in FIG. 1.

FIG. 2 is a more detailed diagram illustrating the crystal oscillator 10, a user control signal source 70, a sequencer 80, a control signal generator 90 and an enable signal generator 100, which may be used in the series ringing signal generator of FIG. 1. In FIG. 2, thin lines represent lines carrying single bit digital signals and thick lines represent lines carrying multi-bit digital signals.

In FIG. 2, a single-pole, triple-throw switch 72 has a pole coupled to a source of a logic '0' signal (ground) and three terminals. The three terminals are coupled to respective input terminals of an encoder 76, and to first terminals of respective pull-up resistors 74, the other terminals of which are all coupled to a source of a logic '1' signal (V). First and second output terminals of encoder 76 produce signals S0 and S1, respectively, and are coupled to respective input terminals of a first decoder 90. A first output terminal of decoder 90 produces a first multibit digital signal and is coupled to the control input terminal of the clock signal generator 20 (of FIG. 1). A second output terminal of decoder 90 produces a second multibit digital signal and is coupled to the control input terminal of the variable attenuator 50 (of FIG. 1).

The crystal oscillator 10 has an output terminal coupled to an input terminal of a frequency divider 82. An output terminal of frequency divider 82 is coupled to a clock input terminal of a counter 84. A count output terminal Q of counter 84 is coupled to an input terminal of a second decoder 102. An output terminal of decoder 102 produces a ring enable signal and is coupled to the control input terminal of the power amplifier 60 (of FIG. 1). A carry-out output terminal CO of counter 84 is coupled to an input terminal of a two-bit counter 86. First and second output terminals of counter 86 produce synchronization signals SYNC A and SYNC B and are coupled to respective input terminals of decoder 90 and to output terminals 25, which are coupled to utilization circuitry (not shown).

In operation, a user may select one of three ringing signal series by setting the armature of switch 72 to a desired terminal. In the illustrated embodiment, switching the armature of switch 72 to the topmost terminal will select the decimonic series (D), as shown in Table I; the middle terminal will select the harmonic series (H); and the bottommost terminal, the synchromonic series (S). The signal supplied to the encoder 76 consists of a logic '0' signal on the selected terminal and logic '1' signals on the other two terminals. Encoder 76 generates a binary signal, in known manner, from signals at its input terminals. For example, the binary output signal representing the decimonic series may be a binary '00' signal, the binary signal representing the harmonic series may be a binary '01' signal, and the binary signal representing the synchromonic series may be a binary '10' signal. The binary output signals from encoder 76 are coupled to the first two input terminals of decoder 90.

The clock signal from the crystal oscillator 10 is frequency divided in divider 82 and the frequency divided signal is coupled to the clock input terminal of counter 84. Counter 84 counts for an amount of time to be taken by one ringing signal in the ringing signal series. In the illustrated embodiment, this is one fourth of a complete ringing signal series cycle. In a preferred embodiment, a complete ringing signal series cycle takes six seconds. Each individual ringing signal in the ringing signal series, thus, takes 1.5 seconds. Counter 84, therefore, counts for a total of 1.5 seconds. After counting for 1.5 seconds, the carry-out output terminal CO produces a carry-out signal, and the counter begins counting the 1.5 second interval again.

The carry-out signal from counter 84 is the clock signal for two-bit counter 86. Counter 86 repetitively counts from binary '00' to binary '11'. Because counter 86 receives a clock pulse every 1.5 seconds from counter 84, a complete counting cycle takes six seconds, with each count having a duration of 1.5 seconds. The output signals from counter 86, thus, represent which time slot in the ringing signal series is currently being generated. The output signals from counter 86 are coupled to further input terminals of decoder 90. The output signals from counter 86 are also supplied to the utilization circuitry (not shown) which may use them to determine when to connect the ringing signal to the tip and ring lines in order to ring a desired subscriber telephone instrument.

Referring to Table I and to the above mentioned U.S. patent application, each individual ringing signal in Table I may be generated by the programmable ringing signal generator (10-60, 90) in response to the presence of a corresponding selection signal at input terminal of the control signal generator 90. Control signal generator 90 (of FIG. 1), consisting of decoder 90 of FIG. 2, generates appropriate control signals in response to the selection signals at its input terminals. The selection signals, as described above, consist of a binary signal from encoder 76 indicating which ringing signal series is desired, and a binary signal from counter 86 indicating which time slot is currently being generated. In other words, the binary signal from encoder 76 determines the row of Table I and the binary signal from counter 86 determines the column of Table I whose entry is to be generated by the ringing signal generator of FIG. 1.

Decoder 90 may be, for example, a read-only memory (ROM) in 15 which the address input terminals are coupled to the encoder 76 and counter 86, and the data output terminals are coupled to the control input terminals of the clock signal generator 20 and variable attenuator 50 (of FIG. 1). The data locations referenced by the address signal are preprogrammed in known manner to contain the desired control signals for the clock signal generator 20 and variable attenuator 50, as described in the above referenced U.S. patent application. Alternatively, decoder 90 may be combinatorial logic designed in a known manner to generate the desired control signals in response to the selection signals.

The count output signal from the count output terminal Q of counter 84 may be used to enable and disable the power amplifier 60 (of FIG. 1) to disable generation of the ringing signal in the interstices between the individual ringing signals, as described above. The count may be decoded in decoder 102 in a known manner to generate a logic '0' signal for the first few and last few counts from counter 84, and to generate a logic '1' signal otherwise. The time period when the output of power amplifier 60 is disabled is preferably 10 ms at both the beginning and end of the time slot. This makes an off period for the power amplifier 60 at the beginning and end of each time slot in the ringing signal series. Decoder 102 may, for example, be combinatorial logic designed in known manner to perform the above described function.

When it is desired to perform zero-crossing switching of the individual ringing signals in the ringing signal series, as described above, the enable signal generator 100 further includes the following elements, shown in phantom in FIG. 2. An input terminal is coupled to the output terminal of the switched capacitor LPF 30 (of FIG. 1) The input terminal is coupled to an input terminal of a zero-crossing detector 106. An output terminal of zero-crossing detector 106 is coupled to a clock input terminal of a D-type flip-flop 108. A Q output terminal of flip-flop 108 is coupled to the control input terminal of power amplifier 60 (of FIG. 1). The output terminal of decoder 102 is coupled to the D input terminal of flip-flop 108.

In operation, zero-crossing detector 106 produces a pulse output signal when the analog sine wave generated by the switched capacitor LPF 30 (of FIG. 1) is at a zero voltage. Flip-flop 108, passes the signal at its D input terminal to its Q output terminal in response to this pulse. The sequence of operation is as follows.

At the beginning of a time slot, decoder produces a logic '0' signal indicating that power amplifier 60 (of FIG. 1) is to disable its output. After a predetermines period of time, decoder 102 produces a logic '1' signal, indicating that power amplifier 60 is to enable its output. This logic '1' signal is coupled to the D input terminal of flip-flop 108. At the next zero-crossing of the analog sine wave from switched capacitor LPF 30 (of FIG. 1) zero-crossing detector 106 produces a pulse signal which causes flip-flop 108 to pass the logic '1' signal from its D input terminal to its Q output terminal. Power amplifier 60 now enables its output, and the ringing signal for the current time slot is produced beginning at a zero-crossing.

At the end of the time slot, decoder again produces a logic '0' signal indicating that power amplifier 60 (of FIG. 1) is to disable its output. This logic '0' signal is coupled to the D input terminal of flip-flop 108. At the next zero-crossing of the analog sine wave from switched capacitor LPF 30 (of FIG. 1) zero-crossing detector 106 produces a pulse signal which causes flip-flop 108 to pass the logic '0' signal from its D input terminal to its Q output terminal. Power amplifier 60 now disables its output, and the ringing signal for the current time slot ends at a zero-crossing. This cycle repeats for each time slot in the ringing signal series.

What we claim is:

1. A series ringing signal generator comprises:

a source of a user control signal;

a programmable ringing signal generator for generating an analog sine wave having a selectable frequency and amplitude in response to a selection signal;

sequencing means, coupled between said source of a user control signal and said programmable ringing signal generator, for repetitively generating a selectable one of a set of sequences of selection signals in response to said user control signal;

a source of a clock signal;

a controlled clock signal generator, having a clock input terminal coupled to said source of a clock signal, a control input terminal, and first and second output terminals;

a switched capacitor low pass filter, having first and second input terminals coupled to said first and second output terminals of said controlled clock signal generator, respectively, and an output terminal;

an analog low pass filter, having an input terminal coupled to said output terminal of said switched capacitor LPF, and an output terminal;

a variable attenuator, having a signal input terminal coupled to said analog LPF, a control input terminal, and an output terminal;

a power amplifier, having a signal input terminal coupled to said output terminal of said variable attenuator, and an output terminal for producing said analog sine wave; and a control signal generator having an input terminal coupled to said sequencing means, and first and second output terminals coupled to said control input terminals of said controlled clock signal generator and said variable attenuator, respectively.

2. The series ringing signal generator of claim 1, further including:

an enable signal generator, having an input terminal coupled to said sequencing means, and an output terminal; wherein:

said sequence of selection signals is time multiplexed and includes a predetermined number of time slots, each time slot including one of said sequence of selection signals;

said power amplifier further includes a control input terminal, coupled to said output terminal of said enable signal generator, for selectably enabling and disabling the signal at its output terminal in response to a control signal at a control input terminal; and said enable signal generator produces a disabling signal at the beginning and end of each time slot, and an enabling signal otherwise.

3. The series ringing signal generator of claim 2, wherein said enable signal generator further includes:

a zero-crossing detector, having an input terminal coupled to said switched capacitor LPF, and an output terminal;

means for producing a bistate signal having a first state for a predetermined period of time at the beginning and end of each of said time slots, and a second state otherwise; and a flip-flop, having a data input terminal coupled to said bistate signal producing means, a clock input terminal coupled to said output terminal of said zero-crossing detector, and an output terminal coupled to said control input terminal of said power amplifier, for producing said enable and disable signal.

* * * * *